United States Patent [19]
Seddon

[11] Patent Number: 6,161,815
[45] Date of Patent: Dec. 19, 2000

[54] SELF-COMPENSATING PROPORTIONAL HYDRAULIC VALVE

[75] Inventor: Don Seddon, Hayling Island, United Kingdom

[73] Assignee: Smiths Industries Public Limited Company, London, United Kingdom

[21] Appl. No.: 09/086,413

[22] Filed: May 29, 1998

[30] Foreign Application Priority Data

Jun. 13, 1997 [GB] United Kingdom .................... 9712327

[51] Int. Cl.$^7$ .................................................. F16K 31/02
[52] U.S. Cl. ............................... 251/129.07; 251/129.08; 137/484.4; 91/459
[58] Field of Search ............................. 137/484.2, 484.4; 251/129.07, 129.08, 120, 129.5, 324; 91/459

[56] References Cited

U.S. PATENT DOCUMENTS

| 3,949,964 | 4/1976 | Freeman | 251/129.07 |
| 4,062,269 | 12/1977 | Chichester et al. | 91/459 |
| 4,313,467 | 2/1982 | Lang | 251/324 |
| 4,714,234 | 12/1987 | Falk et al. | 251/129.07 |
| 5,094,218 | 3/1992 | Everingham et al. | 251/129.08 |

FOREIGN PATENT DOCUMENTS

| 1301333 | 12/1972 | United Kingdom . |
| 2017870A | 10/1979 | United Kingdom . |
| 2239689A | 7/1991 | United Kingdom . |

*Primary Examiner*—Kevin Shaver
*Assistant Examiner*—David A. Bonderer
*Attorney, Agent, or Firm*—Pollock, Vande Sande & Amernick

[57] ABSTRACT

An hydraulic valve has a flow/pressure characteristic matched to that of a pump with which it is used. The valve has a housing with a fluid inlet in its side and an outlet at one end. A shuttle is movable along the housing under control of a proportional solenoid, to vary the amount by which an edge of the shuttle covers the inlet and thereby controls flow of fluid through the valve. The shuttle has a flange one end located between the inlet and outlet so that fluid flowing from the inlet to the outlet applies pressure to one side of the flange and displaces the shuttle to close the inlet. In this way, an increase in pressure tends to reduce the effective size of the inlet aperture to compensate for pressure variation.

9 Claims, 1 Drawing Sheet

SELF-COMPENSATING PROPORTIONAL HYDRAULIC VALVE

BACKGROUND OF THE INVENTION

This invention relates to hydraulic valves and systems.

The invention is more particularly concerned with proportional hydraulic valves that enable flow of hydraulic fluid in a system to be controlled and to systems including proportional hydraulic valves.

Proportional hydraulic valves have some form of actuator, so as a proportional solenoid, that moves a shuttle across an aperture so as to vary the flow of fluid through the aperture, and hence through the valve. The problem with such valves is that the flow of fluid through the valve is dependent on the pressure of fluid supplied to the valve. In order to ensure that the flow of fluid in a system is controlled independently of pressure variations, it is necessary to use an additional valve operating to maintain a constant flow rate regardless of pressure change. This leads to increased cost and complication to the system.

SUMMARY OF THE INVENTION

It is an object of the present invention to provide an improved hydraulic valve and system.

According to one aspect of the present invention there is provided a hydraulic valve comprising a housing and a shuttle member movable within the housing under the action of actuator means, the housing having an aperture through which fluid flows, the shuttle member being arranged to cover a variable proportion of the aperture so as to control flow through the valve. The shuttle member is arranged to be acted on by fluid flowing through the housing in such a way that an increase in fluid pressure urges the shuttle member to reduce the effective size of the aperture and thereby compensate for variation in pressure of fluid.

The shuttle member preferably has a flange located downstream of the aperture so that fluid pressure on a surface of the flange urges the shuttle member in a downstream direction. The shuttle member is preferably movable along its length in the housing, the aperture being formed in a side wall of the housing and the shuttle member having an edge that is movable over the aperture. The valve may include a fluid passage communicating between the housing at one end of the shuttle member and the housing at the opposite end of the shuttle member, preferably the fluid passage extends through the shuttle member. The actuator means may be a proportional solenoid and the valve may include resilient means arranged to urge the shuttle member to a position covering the aperture.

According to another aspect of the invention there is provided an hydraulic system including a pump, an hydraulic device connected with the pump and a valve according to the above one aspect of the invention arranged to control the amount of fluid supplied to the device, the valve having a flow/pressure characteristic substantially matched to that of the pump over a range of pressures.

The valve may be connected between the hydraulic device and a tank to control the amount of fluid bypassing the hydraulic device.

An hydraulic valve and system according to the present invention will now be described, by way of example, with reference to the accompanying drawing.

DETAILED DESCRIPTION OF THE PREFERRED EMBODIMENT

Figure 1:
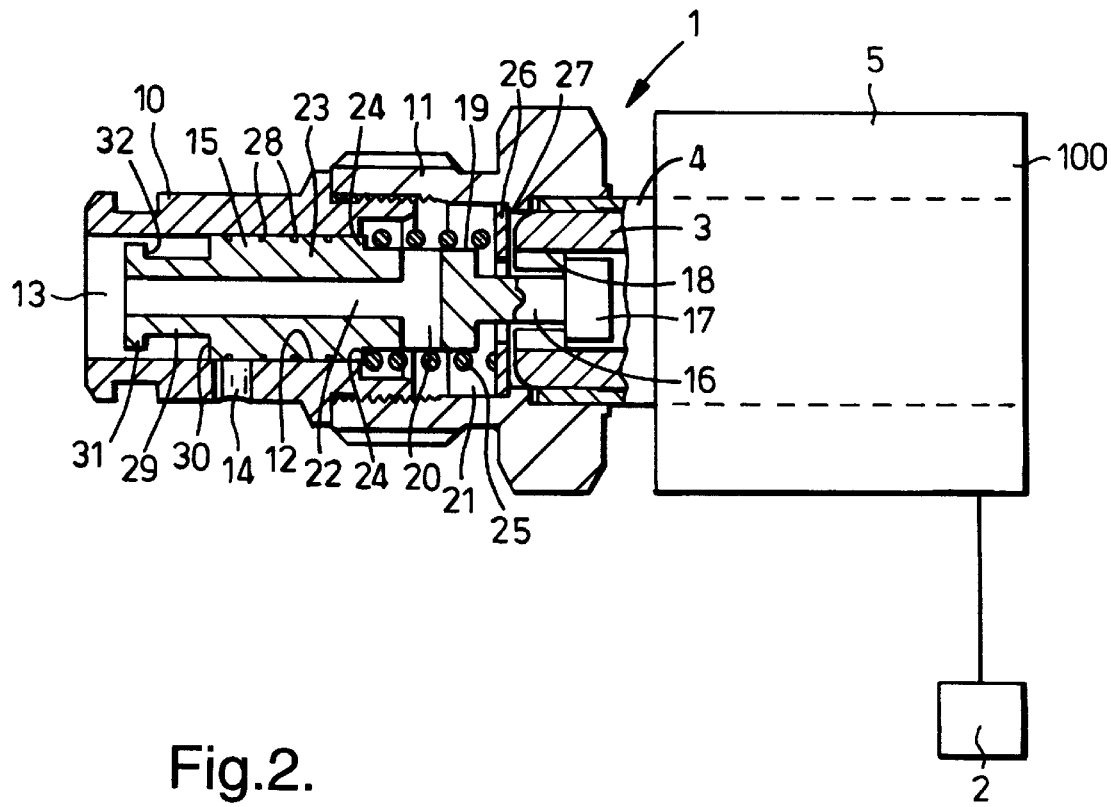
FIG. 1 is a partly sectional side elevation view of the valve.

With reference first to FIG. 1, the valve 1 has a conventional proportional solenoid 100 at its right-hand end electrically connected to a control unit 2. The solenoid 100 has a soft iron armature 3 that is movable along a tube 4 under the action of a magnetic field produced by surrounding windings 5. The control unit 2 varies the power supplied to the windings 5, such as by using conventional pulse width modulation techniques, to move the armature 3 to any desired position along the length of the tube 4.

The forward end of the solenoid 100 is attached to the right-hand, rear end of a valve housing 10 via a threaded coupling 11 screwed onto the outside of the housing. The housing 10 is in the form of a metal cylinder with an axial bore 12 of circular section opening at its forward, left-hand end to provide the outlet aperture 13 of the valve. The housing 10 also has an inlet aperture 14 located about half way along the housing and opening laterally into the housing through its side wall.

The valve includes a shuttle member 15 located within the bore 12 of the housing 10 as a close sliding fit. The rear, right-hand end of the shuttle member 15 is in the form of a reduced diameter rod 16 having an externally-threaded boss 17 screwed into a threaded recess 18 at the forward end of the armature 3 so that it is displaced with the armature. The rod 16 joins with a second region 19 of the shuttle member 15, which has a lateral bore 20 opening into a recess 21 within the coupling 11 and the rear end of the housing 10. The lateral bore 20 connects with an axial bore 22 extending along the shuttle 15 and opening at its forward end.

The forward end of the second region 19 of the shuttle member 15 is joined with a third region 23 of increased diameter by an annular step 24. This step 24 locates the forward end of a helical spring 25, which embraces the second region 19 of the shuttle member. The rear end of the spring 25 engages a face of a washer 26 located on a step 27 around the inside of the coupling 11. The spring 25 is in compression so that it urges the shuttle 15 forwardly. The third region 23 of the shuttle member 15 is a close sliding fit within the bore 12 of the housing 10, the outer surface of the third region having several shallow annular grooves 28 spaced apart along its length to reduce fluid leakage between the outside of the shuttle member and the inside of the housing. At the forward end of the third region 23, there is a step inwardly to a fourth, forward or extension region 29 defining an annular edge 30.

In the natural position of the valve (as shown), with no power applied to the solenoid 100, the spring 25 urges the shuttle 15 to a forward location in which its edge 30 is located just forwardly of the inlet aperture 14. The fourth, forward region 29 forms a reduced-diameter forward extension beyond the edge 30 and is terminated by an outwardly-projecting radial flange 31 located, with the shuttle in the position shown, a short distance rearwardly of the outlet aperture 13.

In use, the valve is connected in series in an hydraulic fluid flow path, with the inlet aperture 14 connected to a fluid supply line and the outlet aperture 13 connected to a fluid outlet line, neither shown in FIG. 1. When no power is supplied to the solenoid 100 and the valve is in the position shown, the shuttle 15 prevents flow of fluid through the inlet aperture 14, so the valve is closed and no fluid can flow in the flow path. When power is applied to the solenoid 100, the armature 3, and hence the shuttle 15, is pulled rearwardly against the action of the spring 25 by a distance proportional to the applied power. If the power is sufficient to pull the edge 30 to the rear of the forward part of the inlet aperture 14, fluid will be able to flow into the valve through the inlet aperture. The fluid flows forwardly along an annular recess between the outside of the extension 29 and the inside of the housing 10. Fluid flow is restricted in the region of the flange 31, which is located downstream of the inlet aperture 14, causing pressure to be applied to its rear-facing surface 32. Fluid flows around the flange 31 and out through the outlet aperture 13. Fluid pressure will also be applied via the axial bore 22 and lateral bore 20 to the recess 21. This has the effect of helping to balance the pressure exerted by the fluid on the shuttle 15 on opposite sides of the seal made by the shuttle in the housing 10.

If the control unit 2 were to increase the power applied to the solenoid 100, this would cause the shuttle 15 to move further to the rear, exposing a greater area of the inlet aperture 14 and thereby increasing flow of fluid through the valve. If the pressure of fluid at the inlet aperture 14 should increase, this would increase the pressure on the rear-facing surface 32 of the flange 31 in such a way as to move the shuttle 15 forwardly against the action of the solenoid 100, and thereby reduce the effective size of the inlet aperture 14. This, thereby, reduces the flow of fluid. The size and shape of the flange 31 are selected so that the forward movement of the shuttle 15 caused by an increase in pressure of the inlet fluid is just sufficient to reduce the effective size of the inlet aperture 14 sufficiently to maintain a desired flow/pressure characteristic through the valve.

This relatively simple modification of a proportional hydraulic valve enables it to provide a desired flow/pressure characteristic, without the need for a separate valve to compensate for pressure variations.

It will be appreciated that there are various ways other than use of the radial flange that the shuttle member could be arranged to be acted on by fluid flowing through the housing in such a way that an increase in fluid pressure urges the shuttle member downstream to reduce the effective size of the inlet aperture. Instead of the solenoid, the shuttle member could be displaced by another form of actuator.

Figure 2:
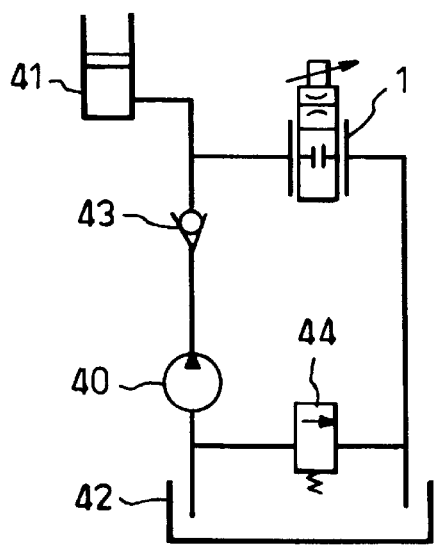
FIG. 2 illustrates the system schematically.
Figure 3:
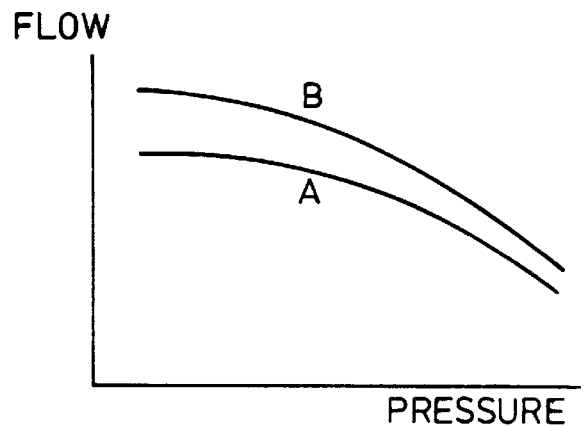
FIG. 3 is a graph showing the flow/pressure characteristics of the valve and of the pump.

With reference now to FIGS. 2 and 3, the proportional valve 1 is connected in a system to control flow of fluid from a pump 40 to a cylinder 41. The pump 40 is connected between the tank 42 and the inlet of the cylinder 41 via a one-way valve 43. A pressure relief valve 44 is connected between the tank 42 and a location between the pump 40 and the oneway valve 43. The proportional valve 1 is connected between the tank 42 and a location between the cylinder 41 and the one-way valve 43. The proportional valve 1 is adjusted to control the amount of fluid from the pump 40 that bypasses the cylinder and flows back to tank. Thus, when the valve 1 is closed, the maximum flow of fluid passes to the cylinder 41. As mentioned above, the characteristic of the proportional valve 1 is such that it automatically reduces flow through the valve when pressure increases, without any change in current to the solenoid. The flow/pressure characteristic of the valve 1 is shown in the graph of FIG. 3 by the line "A". It will be appreciated that this characteristic could have other shapes and could, for example, be flat where it is necessary to have a constant flow over a range of pressures. The graph also shows the characteristic of the pump 40, as line "B". It can be seen that the characteristic of the valve 1 has been selected to match that of the pump 40, so that the ratio between flow through the pump and flow through the valve is substantially constant at different pressures.

What I claim is:

1. A hydraulic valve comprising:
a housing;
a shuttle member movable within said housing;
an actuator arranged to move said shuttle member; and
a fluid passage communicating between said housing at one end of said shuttle member and said housing at an opposite end of said shuttle member,
wherein said housing has a side aperture for fluid flow, wherein said shuttle member is slidable over said aperture to cover variable proportion of said aperture so as to control flow through said valve in a variable manner, and wherein said shuttle member is arranged to be acted on by fluid flowing through said housing in such a way that an increase in fluid pressure urges said shuttle member to reduce the effective size of said aperture and thereby compensate for variation in pressure of fluid.

2. A hydraulic valve comprising:
a housing;
a shuttle member movable within said housing; and
an actuator arranged to move said shuttle member and comprising a proportional solenoid,
wherein said housing has a side aperture for fluid flow, wherein said shuttle member is slidable over said aperture to cover variable proportion of said aperture so as to control flow through said valve in a variable manner, and wherein said shuttle member is arranged to be acted on by fluid flowing through said housing in such a way that an increase in fluid pressure urges said shuttle member to reduce the effective size of said aperture and thereby compensate for variation in pressure of fluid.

3. A hydraulic valve system comprising a pump, a hydraulic device connected with said pump and a valve arranged to control the amount of fluid supplied to said device, wherein said valve comprises
a housing;
a shuttle member movable within said housing; and
an actuator arranged to move said shuttle member and comprising a proportional solenoid,
wherein said housing has a side aperture for fluid flow, wherein said shuttle member is slidable over said aperture to cover variable proportion of said aperture so as to control flow through said valve in a variable manner, and wherein said shuttle member is arranged to be acted on by fluid flowing through said housing in such a way that an increase in fluid pressure urges said shuttle member to reduce the effective size of said aperture and thereby compensate for variation in pressure of fluid, and wherein said valve has a flow/pressure characteristic substantially matched to that of said pump over a range of pressures.

4. A hydraulic valve according to claim 1 including a fluid passage, said fluid passage communicating between said housing at one end of said shuttle member and said housing at an opposite end of said shuttle member.

5. A hydraulic valve according to claim 4, wherein said shuttle member has a flange located downstream of said aperture so that fluid pressure on a surface of said flange urges said shuttle member in a downstream direction.

6. A hydraulic valve according to claim 1, wherein the shuttle member is movable along its length in said housing, wherein said aperture is formed in a side wall of said housing, and wherein said shuttle member has an edge that is movable over said aperture.

7. An hydraulic valve according to claim 1 further including a resilient member arranged to urge said shuttle member to a position covering said aperture.

8. A hydraulic valve system comprising a pump, a hydraulic device connected with said pump and a valve arranged to control the amount of fluid supplied to said device, wherein said valve comprises: a housing; a shuttle member movable within said housing; and an actuator arranged to move said shuttle member, wherein said housing has a side aperture for fluid flow, wherein said shuttle member is slidable over said aperture to cover a variable proportion of said aperture so as to control flow through said valve in a variable manner, and wherein said shuttle member is arranged to be acted on by fluid flowing through said housing in such a way that an increase in fluid pressure urges said shuttle member to reduce the effective size of said aperture and thereby compensate for variation in pressure of fluid, and wherein said valve has a flow/pressure characteristic substantially matched to that of said pump over a range of pressures.

9. A hydraulic valve comprising: a cylindrical housing; a shuttle member movable along the length of said housing; and a proportional solenoid at one end of said housing arranged to move said shuttle member along the length of said housing, wherein said housing has a fluid flow inlet aperture opening laterally in said housing and an outlet aperture at an end of said housing opposite said one end, wherein said shuttle member has an edge that is movable to cover a variable proportion of said inlet aperture so as to control flow through said valve, wherein said valve includes a fluid flow passage between opposite ends of said housing to equalize fluid pressure across said shuttle member, and wherein said shuttle member has a radial projection located between said inlet and outlet apertures acted on by fluid flowing through said housing in such a way that an increase in fluid pressure urges said shuttle member towards said outlet aperture.

* * * * *